(12) United States Patent
Bräutigam et al.

(10) Patent No.: US 6,271,750 B1
(45) Date of Patent: Aug. 7, 2001

(54) SIDE FLASHING LAMP

(75) Inventors: Markus Bräutigam, Immelborn; Rolf Künstler, Eisenach, both of (DE)

(73) Assignee: Fer Fahrzeugelektrik GmbH, Eisenach (DE)

( * ) Notice: Subject to any disclaimer, the term of this patent is extended or adjusted under 35 U.S.C. 154(b) by 0 days.

(21) Appl. No.: 09/618,054

(22) Filed: Jul. 17, 2000

(30) Foreign Application Priority Data

Jul. 19, 1999 (DE) .............................................. 199 33 724

(51) Int. Cl.⁷ ....................................................... B60Q 1/26
(52) U.S. Cl. ........................... 340/468; 340/471; 340/475; 362/137; 362/494
(58) Field of Search .................................... 340/468, 471, 340/475, 463, 465; 362/487, 494, 514, 137, 140, 498

(56) References Cited

U.S. PATENT DOCUMENTS

| | | | |
|---|---|---|---|
| 5,499,169 | * 3/1996 | Chen | 362/83.1 |
| 5,774,283 | 6/1998 | Nagel et al. | 359/838 |
| 5,938,322 | * 8/1999 | Alonzo, Jr. et al. | 362/494 |
| 6,049,271 | * 4/2000 | Chu | 340/463 |
| 6,152,587 | * 11/2000 | Berg | 362/494 |
| 6,176,602 | * 1/2001 | Pastrick et al. | 362/494 |

* cited by examiner

*Primary Examiner*—Daniel J. Wu
*Assistant Examiner*—Toan Pham
(74) *Attorney, Agent, or Firm*—Sughrue, Mion, Zinn, Macpeak & Seas, PLLC

(57) ABSTRACT

A side flashing lamp for fitting into a cover cap of a motor vehicle external rear view mirror includes a lamp housing with a light exit opening and a translucent cover which closes the opening. The translucent cover is curved in such a way that it extends from the outward side, that is remote from the vehicle, in a continuous transition into the front side of the cover cap, which faces approximately in the direction of forward travel of the vehicle. The lamp has at least one light source in the lamp housing and at least one reflector for focusing the light of the light source in a main radiation direction which faces substantially in the direction of forward travel of the vehicle. The lamp includes at least one further light source with a reflector which focuses the light thereof transversely with respect to the main radiation direction. Arranged in the beam path of the further light source and reflector is a light deflection element which deflects the major part of the light focused by that reflector in an inclinedly rearwardly extending radiation direction.

13 Claims, 2 Drawing Sheets

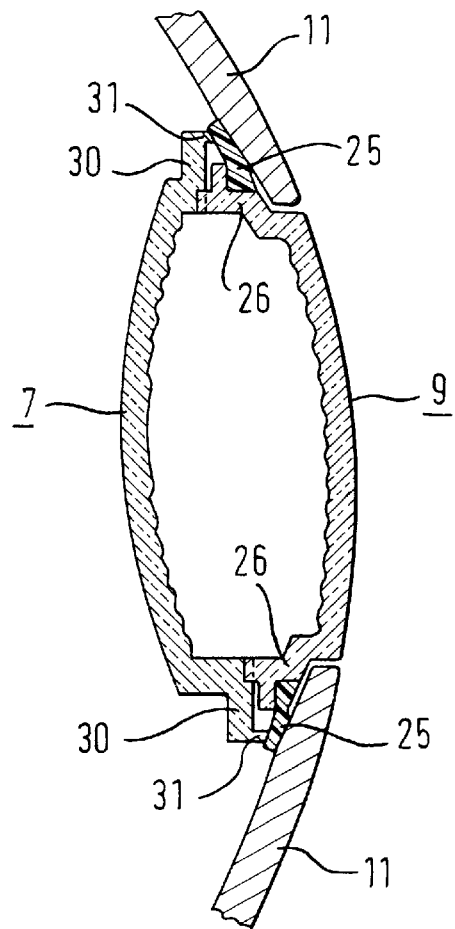
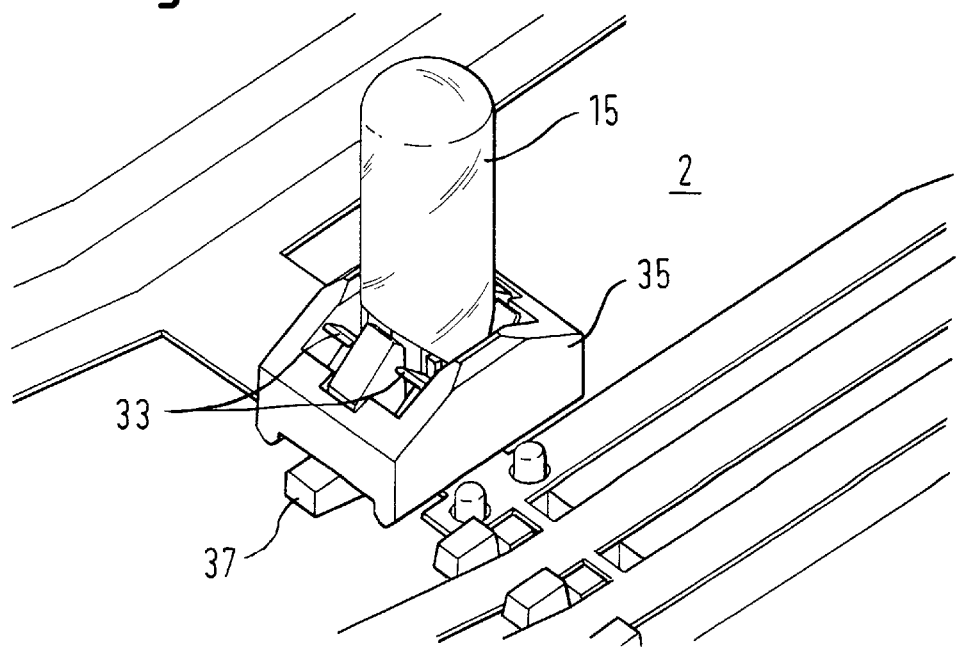

SIDE FLASHING LAMP

FIELD OF THE INVENTION

The invention concerns a side flashing lamp, more particularly a side flashing lamp for fitting into the housing or cover cap of an external rear view mirror for a motor vehicle.

BACKGROUND OF THE INVENTION

A side flashing lamp which can be fitted into the cover cap or housing of an external rear view mirror for a motor vehicle can be found for example in U.S. Pat. No. 5,774,283. That side flashing lamp includes a lamp housing with a light exit opening which is closed by a translucent cover. The translucent cover is curved in such a way that, in the installed condition of the side flashing lamp, it extends from the outward end of the cover cap or housing, which is remote from the vehicle, with a continuous transition, into the front side of the cover cap or housing, which faces in the direction of travel of the vehicle. At least one light source is fixedly mounted in the lamp housing and the flashing lamp includes at least one reflector for focusing the light in a main radiation direction which in the installed condition points substantially in the direction of travel of the vehicle. The location at which the side flashing lamp is installed in the cover cap is disposed at the outwardly facing end thereof, remote from the vehicle, while the reflector surrounding the light source which is formed by an incandescent lamp member is arranged in such a way that the main radiation direction extends forwardly with an angle of inclination. The translucent cover is so shaped that it provides for a continuous extension of the external contour of the cover cap. In plan in relation to the position of installation thereof, the translucent cover is curved in such a way that it extends over an angle of about 90°, that is to say it faces with its outermost end region approximately transversely with respect to the direction of travel of the vehicle. That configuration is intended to provide that the light which is emitted by the light source when switched on can also be perceived by people who are positioned laterally of the motor vehicle. In order still further to enhance that effect, the reflector is longer in plan on the side which is closer to the vehicle, and is also extended further forwardly, so that it focuses the light which is outputted from the light source in a direction towards the vehicle and reflects it in a focused condition in the opposite lateral direction.

It will be noted however that a disadvantage with the arrangement as outlined above is that it is not possible to provide for rearward radiation of the light produced by the light source, that is to say the light cannot be radiated in the opposite direction to the above-mentioned main radiation direction or the direction of forward travel of the vehicle, so that people who are positioned inclinedly or precisely behind a vehicle fitted with such a side flashing lamp cannot see it.

SUMMARY OF THE INVENTION

An object of the invention is to provide a side flashing lamp for fitting in an external rear view mirror of a motor vehicle, which can be seen not only from the front and from the side but also from positions which are inclinedly behind the vehicle on which the lamp is fitted.

A further object of the present invention is to provide a side flashing lamp for installation in a housing of a motor vehicle external rear view mirror, which can afford a more extensive and quasi-panoramic lighting effect to enhance the visibility of the lamp.

Yet another object of the present invention is to provide a side flashing lamp in a motor vehicle external rear view mirror housing, which affords enhanced light visibility while being of a simple internal structure.

Yet a further object of the present invention is to provide a combination of a motor vehicle external rear view mirror housing and a side flashing lamp which entail a closely integrated structural configuration while affording a wide range of lamp visibility in terms of positions relative thereto.

In accordance with the principles of the present invention the foregoing and other objects are attained by a side flashing lamp for fitting in the cover cap or housing of an external rear view mirror for a motor vehicle, comprising a lamp housing having a light exit opening. A translucent cover closes the light exit opening of the lamp housing and is curved in such a way that, in an installed condition, it extends from the outward side of the cover cap, which is remote from the vehicle, with a continuous transition, into the front side of the cover cap which faces at least approximately in the direction of forward travel of the vehicle. At least one light source is mounted in the lamp housing at a fixed position therein. At least one reflector is operable to focus the light of the light source in a main radiation direction which in the installed condition faces substantially in the direction of forward travel of the vehicle. The lamp also includes at least one further light source, with a respective further reflector for reflecting and focusing the light of the further light source substantially transversely with respect to the main radiation direction, towards the outside. A light deflection element is arranged in the beam path of the further reflector and is operable to deflect the major part of the light focused by the further reflector in such a way that it has a radiation direction which extends inclinedly rearwardly with respect to the main radiation direction.

Accordingly, as will be seen in greater detail from the description hereinafter of preferred embodiments of the invention, in addition to the at least one light source which by virtue of its arrangement and the configuration of the reflector operatively associated therewith outputs its light in the main radiation direction, that is to say substantially in the direction of forward travel of the vehicle on which the external rear view mirror with side flashing lamp is fitted, the side flashing lamp according to the invention has a further light source which is positioned towards the outward side of the external rear view mirror, with a reflector of such a configuration that it focuses the light substantially transversely with respect to the main radiation direction, that is to say towards the outside of the motor vehicle. That arrangement can already be such that a certain part of the light focused by that reflector is irradiated with a component that is directed rearwardly of the vehicle. In order still further to enhance that effect, the invention additionally provides that disposed in the beam path of that further reflector is a light deflection element, for example a prism, so arranged that it deflects the major part of the light focused by the further reflector into a radiation direction which is directed inclinedly rearwardly of the vehicle, with respect to the main radiation direction.

Further objects, features and advantages of the invention will be apparent from the description hereinafter of preferred embodiments of the invention.

BRIEF DESCRIPTION OF THE DRAWING

FIG. 3 is a view in vertical section through a side flashing lamp according to the invention fitted in the cover cap of an external rear view mirror, and FIG. 4 shows a perspective view of the fixing of one of the lamp members on the lamp carrier in accordance with the present invention.

DESCRIPTION OF PREFERRED EMBODIMENTS

Figure 1:
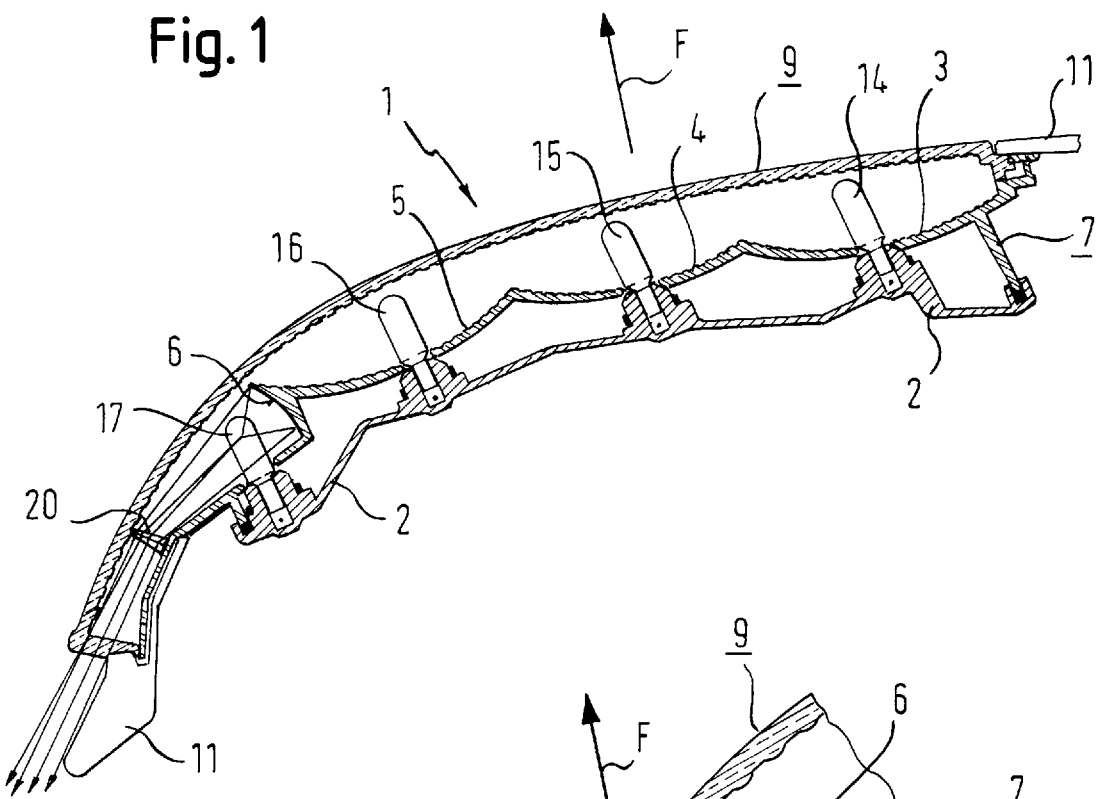
FIG. 1 is a plan view in section of a side flashing lamp according to the invention installed in the cover cap of an external rear view mirror for a motor vehicle.
Figure 2:
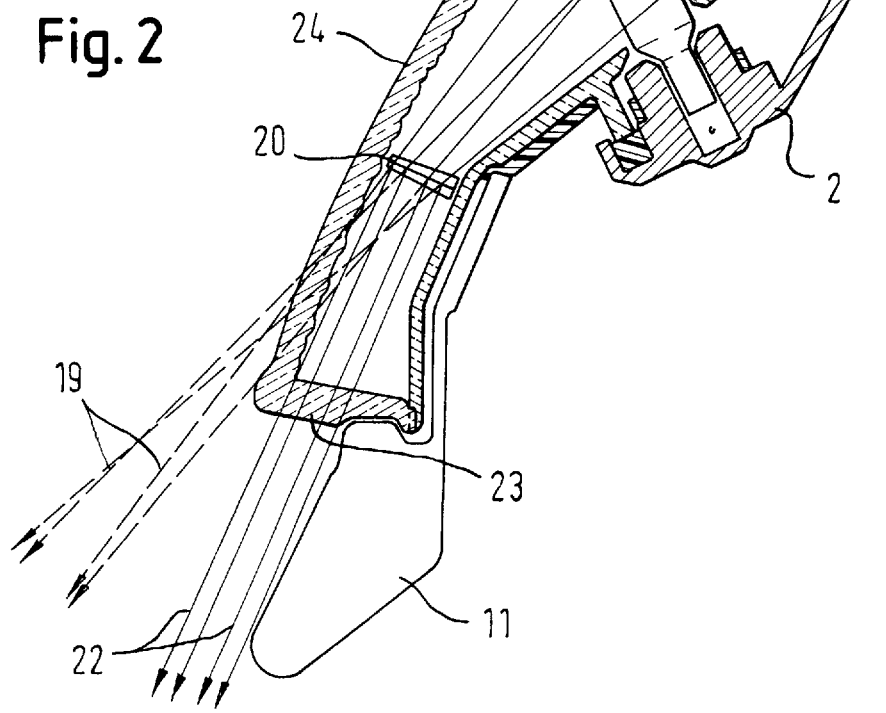
FIG. 2 is a view on an enlarged scale of a detail from FIG. 1.

Referring firstly to FIGS. 1 and 2, shown therein is a view in section through a side flashing lamp according to the invention, as indicated generally at 1. The section line in both FIGS. 1 and 2 extends horizontally when considering the side flashing lamp according to the invention, in the condition of being fitted into a cover cap or housing of an external rear view mirror on a motor vehicle.

The side flashing lamp 1 includes a lamp housing which is formed by a lamp member carrier 2 for carrying a plurality of lamp members, and a reflector arrangement which is generally indicated at 7 in FIG. 3 and which comprises a plurality of reflector portions indicated at 3, 4, 5 and 6 in FIG. 1. The lamp housing has a light exit opening (not referenced) which is closed by a translucent cover 9 of a curved configuration.

As will be seen more specifically from FIG. 1, the translucent cover 9 which is curved in the plane of the section therein is fitted into a cover cap 11 of a motor vehicle external rear view mirror in such a way that it extends from the outward side of the cover cap 11, which is remote from the vehicle, that is to say at the left in FIGS. 1 and 2, with a continuous transition configuration, into the front side of the cover cap 11, which faces approximately in the direction of forward travel of the motor vehicle which is indicated by arrow F in the upper part of each of FIGS. 1 and 2.

In the illustrated embodiment, mounted on the lamp member carrier 2 are a total of four light sources 14, 15, 16 and 17 which are formed by suitable lamp members such as incandescent lamps and each of which is surrounded by a respective one of the reflectors 3, 4, 5 and 6 in such a way that its light is focused in the desired radiation direction. In regard to the three light sources 14, 15 and 16 which are shown at the right in FIG. 1, that radiation direction is the main radiation direction which faces substantially in the direction of forward travel of the motor vehicle as is thus indicated by the arrow F.

In comparison, the reflector 6 operatively associated with the fourth further light source 17 which is arranged entirely outwardly in the assembly as can be seen from FIG. 1 is such that its light is focused substantially transversely with respect to the main radiation direction F, towards the outside, that is to say towards the left in FIGS. 1 and 2.

Reference will be made more particularly at this point to FIG. 2 in which broken-line arrows 19 show how the light focused by the further reflector 6 from the further light source 17 would issue from the translucent cover 9, without additional measures. It will be seen that this light exit direction admittedly also entails a component which faces rearwardly, that is to say in the opposite direction to the direction of forward travel F of the motor vehicle on which the mirror with side flashing lamp is mounted, but it is also nonetheless substantially directed transversely with respect to the main direction of radiation of the side flashing lamp.

In order to produce a radiation which is even more directed rearwardly of the vehicle on which the mirror and side flashing lamp is mounted, the assembly therefore includes a light deflection element 20 which in the embodiment of FIGS. 1 and 2 is shown in the form of a bar-shaped or rod-shaped prism. As can be seen from the Figure, the prism is of triangular cross-section, extending substantially in a vertical direction in the installed condition. As the arrows 22 in solid lines in FIG. 2 show, the light deflection element 20 provides for rearward deflection to an increased degree of the light which is produced by the light source 17, so that that deflected light issues from the translucent cover 9 substantially in opposite relationship to the main radiation direction F. For that purpose, at its end which is at the left in FIGS. 1 and 2, the translucent cover 9 has a light exit surface 23 which faces inclinedly rearwardly and which extends approximately at a right angle to the main light exit surface of the translucent cover 9 in that region, as indicated by reference numeral 24 in FIG. 2.

Reference will now be made to FIG. 3 showing a view in vertical section illustrating only the cover cap 11 of the external rear view mirror, the translucent cover 9, a part of the reflector arrangement 7 and a seal 25. As can be seen therefrom, the main part of the translucent cover 9 which fills the corresponding light exit opening of the cover cap 11 projects with respect to an edge region 26 which is set back in a stepped configuration and which, in the installed condition, presses a seal 25 which extends around the entire lamp housing against the cover cap 11 from the inside thereof. The reflector arrangement 7 has a peripheral edge portion 30 with a projection 31. The peripheral edge portion 30 projects outwardly beyond the edge region 26 of the translucent cover 9. The projection 31 is of such a configuration that it additionally presses the seal 25 along a peripheral line against the inside surface of the cover cap 11 which is disposed further outwardly with respect to the contact zone at which the edge region 26 of the translucent cover 9 produces its pressing effect. The fact that the seal 25 is subjected to a contact pressure at two locations in the above-indicated manner advantageously provides that the light exit opening of the cover cap 11 is closed in such a way as to enjoy complete sealing integrity.

FIG. 4 shows a manner of fixing the lamp members or light sources on the lamp member carrier 2, which is preferred in accordance with the invention. In this respect, the lamp member which has been randomly adopted for the purposes of this part of the description is the lamp member indicated at 15 in FIG. 1. It will be appreciated that the other lamp members 14, 16 and 17 are also mounted on the lamp member carrier 2 in the same or comparable fashion.

It will be seen from FIG. 4 that the lamp member 15 is not just simply inserted between the contacts 33 of the lamp member carrier 2. Rather, in order to ensure that the lamp member 15 is securely held in position and accurately oriented, the assembly includes a frame-like fixing element which is indicated generally at 35 and which is fitted on to a rib 37 of the lamp member carrier 2 in such a way that it surrounds the base of the lamp member 15 from all sides and fixes it in a clearly defined position in such a way as to ensure proper orientation of the lamp member even over long periods of time and when severe vibration is involved.

If a plurality of, for example three, light sources or lamp members are disposed in vertically mutually superposed relationship, as is preferably the case for example in regard to the further light source 17, they can also additionally be held in position by a common fixing element.

It will be noted that the reflectors in the above-described assembly are operable to focus the light of the operatively associated light source in a vertical direction into a respective narrow aperture angle which includes a horizontal plane.

It will be noted from the foregoing description that the described combination of features ensures excellent visibility for the side flashing lamp according to the invention not only from the front of the vehicle and from the side of the vehicle on which the side flashing lamp is mounted, but also from a large angular range which is behind the motor vehicle in question.

It will be appreciated that the above-described structures have been set forth solely by way of example and illustration of the principles of the present invention and that various other modifications and alterations may be made therein without thereby departing from the spirit and scope of the invention.

What is claimed is:

1. A side flashing lamp for fitting in the cover cap of an external rear view mirror for a motor vehicle, comprising
   a lamp housing having a light exit opening,
   a translucent cover which closes the light exit opening of the lamp housing and which is curved in such a way that in the installed condition it extends from the outward side of the cover cap, which is remote from the vehicle, with a continuous transition into the front side of the cover cap, which faces at least approximately in the direction of forward travel of the vehicle,
   at least one first light source mounted in the lamp housing at a fixed position therein,
   at least one reflector operable to focus the light of the at least one first light source into a main radiation direction which faces substantially in said direction of forward travel,
   at least one further light source,
   at least one further reflector operatively associated with said further light source for reflecting and focusing the light of the further light source substantially transversely outwardly with respect to said main radiation direction, and
   a light deflection means disposed in the beam path of the further reflector and operable to deflect the major part of the light focused by said further reflector in such a way that it has a radiation direction which extends inclinedly rearwardly with respect to the main radiation direction.

2. A lamp as set forth in claim 1 wherein the light deflection means is a prism.

3. A lamp as set forth in claim 1 wherein the reflectors are operable to focus the light of the operatively associated light source in a vertical direction into a respective narrow aperture angle which includes a horizontal plane.

4. A lamp as set forth in claim 2 wherein the light deflection means is in the form of a prismatic rod of triangular cross-section, said rod extending substantially in a vertical direction in the installed condition.

5. A lamp as set forth in claim 1 wherein the translucent cover has a light exit surface which extends inclinedly rearwardly in the installed condition with respect to the main radiation direction.

6. A lamp as set forth in claim 1 wherein the at least one reflector which focuses the light of the at least one light source in the main radiation direction and the further reflector form an integral reflector assembly.

7. A lamp as set forth in claim 6 including
   a plurality of said light sources arranged in mutually juxtaposed relationship transversely with respect to the main radiation direction,
   a plurality of reflectors operatively associated with each of said plurality of light sources for focusing the light thereof in the main radiation direction,
   wherein all said reflectors are integrally connected to form said reflector assembly.

8. A lamp as set forth in claim 1 wherein the translucent cover has a main part and a set-back edge portion surrounding the main part, the arrangement being such that when the lamp is fitted from the interior into an opening in the cover cap of the external rear view mirror the main part of the translucent cover at least substantially fills said opening while the set-back edge region surrounding said main part is pressed from the inside against the inside wall of the cover cap which surrounds the opening, and further including a seal interposed between said inside wall and said translucent cover.

9. A lamp as set forth in claim 8 wherein the reflector assembly has a peripheral edge portion and at said peripheral edge portion a projection which extends substantially over the entire periphery and which additionally presses said seal against the inside wall of the cover cap.

10. A lamp as set forth in claim 1 and further including
    a lamp member carrier carrying the at least one light source, and
    a fixing element surrounding the base of a said light source, the fixing element being engaged with the lamp carrier on the one hand and with the base of the light source on the other hand, in such a way that the light source is in an accurately oriented position.

11. A lamp as set forth in claim 1 wherein the further light source includes a plurality of lamps which are arranged substantially vertically one above the other in the installed condition and each of which has its own said further reflector.

12. A lamp as set forth in claim 11 including
    a light deflection element common to the further reflectors, the arrangement such that the major part of the light focused by the further reflectors is so diverted by a common light deflection element that it has a radiation direction which extends inclinedly rearwardly with respect to the main radiation direction.

13. A motor vehicle external rear view mirror assembly including
    a mirror housing for accommodating a mirror,
    and a side flashing lamp in the mirror housing comprising
    a lamp housing having a light exit opening,
    a translucent cover which closes the light exit opening of the lamp housing and which is curved to extend from the outward side of the mirror housing into the front side of the mirror housing which faces at least approximately in the direction of forward travel of the vehicle,
    at least one first light source mounted in the lamp housing at a fixed position therein,
    at least one reflector operable to focus the light of the at least one first light source into a main radiation direction which faces substantially in said direction of forward travel,
    at least one further light source,
    at least one further reflector operatively associated with said further light source for reflecting and focusing the light of the further light source substantially transversely outwardly with respect to said main radiation direction, and a light deflection means disposed in the beam path of the further reflector and operable to deflect the major part of the light focused by said further reflector in such a way that it has a radiation direction which extends inclinedly rearwardly with respect to the main radiation direction.

* * * * *